United States Patent Office 3,307,700
Patented Mar. 7, 1967

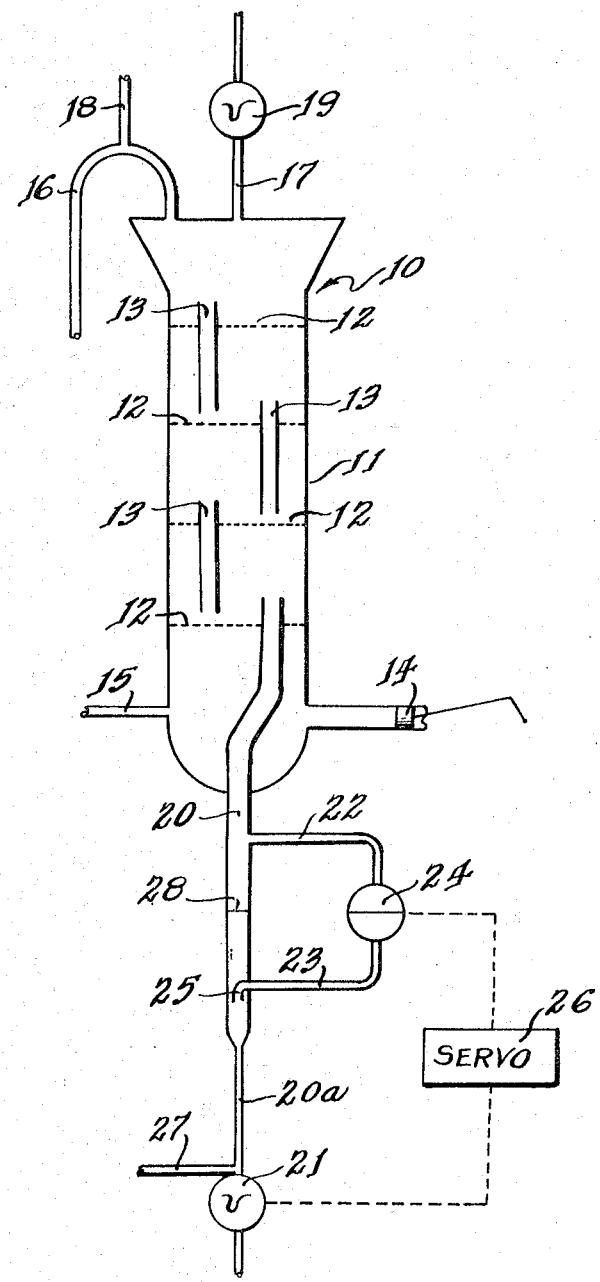

3,307,700
APPARATUS FOR CONTROLLING THE FLOW
OF SOLIDS
Noel H. de Nevers, Salt Lake City, Utah, assignor to the United States of America as represented by the United States Atomic Energy Commission
Filed Apr. 28, 1966, Ser. No. 546,488
4 Claims. (Cl. 210—112)

The invention described herein was made in the course of, or under, a contract with the United States Atomic Energy Commission.

This invention concerns an apparatus for controlling the flow rate of solids from a vessel containing both solid and liquid matter. More particularly, the invention relates to the removal of solids automatically from a vessel into which the solids are delivered at a variable rate.

It is desirable to release solids from an apparatus such as a contactor in which liquid is pulsed through solids for ion exchange, at the same rate at which the solids end their contact with the pulsed liquid. This means that the storage or inventory of solids that have completed this contact is kept constant.

According to my invention, I keep the supply of used solids constant by selecting vertically spaced points in a storage leg above and below the top of the solids in the leg and use the difference in pressures existing at these vertically spaced points to open and close a valve for releasing solids from the leg. I fluidize the solids in the leg in order to enable the pressure at the point in the column below the top of the solids to reflect the amount of the solids above this point. Fluidizing of the solids prevents the valve from becoming clogged with the solids when opened.

The single figure of the drawing is a diagrammatic view showing the solids controller of the present invention and a solids-liquid contactor to which it may be applied.

A contactor 10 comprises a vertical hollow column 11, a plurality of vertically spaced horizontal perforated plates 12 extending across the column 11, a plurality of downcomers 13 located in all but the bottom plate 12, one to a plate, a pulser 14, an inlet line 15 for liquid near the bottom of the column 11, an outlet line 16 for liquid at the top of the column, and an inlet line 17 for solids or slurry at the top of the column. The fluid outlet line 16 has an air vent 18. The solids inlet line 17 has a valve 19.

A storage or inventory leg 20 has its top above the bottom plate 12 and extends downwardly therethrough and through the closed bottom of the column 11 for an appreciable distance. The lower end of the leg 20 is connected to a line 20a, in which a valve 21 is connected.

Upper and lower pressure taps 22 and 23 which are liquid-filled lines, are connected to points of the leg 20 which are spaced vertically from one another an appreciable distance, and to a differential pressure cell 24. The lower pressure tap 23 has an end 25 which is turned downward. The differential pressure cell 24 acts through a servo 26 to control the valve 21. A metered flow of fluidizing liquid is supplied by a line 27 connected to the line 20a just above the seat of the valve 21.

In operation, slurry composed of liquid and solids such as resin are fed through the line 17 to the top of the column 11, and a liquid such as an aqueous solution with respect to which the solids are to undergo an ion exchange is fed through the line 15 into the lower end of the column 11. The solids pile up on the top plate 12, overflow its downcomer 13 and descend therethrough to second plate 12, pile up thereon, overflow its downcomer 13, and descend therethrough to the third plate 12, etc. The liquid, which is lighter than the solids, is pulsed by the pulser 14 upward through the perforations in the plates 12 and through the solids piled thereon. The ion exchange is effected by passage of the liquids through the solids.

When sufficient solids have flowed into the contactor 10, the solids will have reached the bottom plate 12 and piled up enough thereon to overflow into the storage leg 20. The solids will reach some level in the storage leg 20 between the pressure taps 22 and 23, which level is indicated at 28. The purpose of the control device of the present invention is to maintain the level 28.

The pressure transmitted by the tap 23 to the differential pressure cell 24 is greater than that transmitted by the tap 22 by an amount dependent on the weight of the liquid and solids in the section of the leg 20 between the pressure taps 22 and 23. This is true provided the solids in the leg 20 are fluidized by the fluid from the line 27. The higher the level 28 of solids, the greater the percentage of solids in the aforesaid section of the column 11, the greater the pressure difference between taps 22 and 23, because the solids have a greater density than the liquid. When the pressure difference exceeds a predetermined value, the differential pressure cell 24 acts through the servo to open the valve 21. Consequently, the level 28 of the solids is lowered until the pressure difference transmitted by the taps 22 and 23 to the cell 24 is lowered sufficiently for the cell to act through the servo 26 to shut the valve 21.

When the valve 21 opens to release solids, the fluidizing of the solids above the valve by the liquid introduced in the leg 20 by the line 27 prevents the solids from clogging the valve. As the valve 21 opens wider, the fluidizing of the solids prevents them from being dumped. Thus the level 28 of the solids in the leg 20 goes down sowly, and the valve 21 can be closed in time to keep the level 28 at or only a little below its setting. The liquid entering the leg 20 by the line 27 compensates for the liquid accompanying the solids out through the valve 21, so that as little liquid as possible is removed from the system. Yet the flow of liquid from the line 27 into the leg 20 must be low enough that the net upward liquid velocity (with the valve closed) must be lower than the free-settling velocity of the small particles of the solids in the system, or the small particles will not pass down through the leg 20.

When the valve 21 is closed, the downwardly directed end 25 on the lower pressure tap 23 has a Pitot-tube effect and increases the pressure transmitted by the pressure tap 23 to the cell 24, because of the upward flow of the fluidizing liquid in the leg 20 due to the fluidizing liquid from the line 27. When the valve 21 is open, however, the net flow of solids is downward, in spite of fluidization, and the downwardly directed end 25 decreases the pressure transmitted through the tap 23. Thus there is a reversal of the Pitot-tube effect, and a negative feedback on the system is provided, which makes the system very stable and immune to upsets caused by changes in operating conditions.

It is to be understood that the invention is not limited by the details given herein but that it may be modified within the scope of the appended claims.

The embodiments of the invention in which an exclusive property or privilege is claimed are defined as follows:

1. In a system having a vertical column, vertically spaced horizontal plates therein for piling solids thereon downcomers in the plates for receiving an overflow of said solids and conducting said overflow solids downwardly, and a storage leg extending through the lowest plate and through the bottom of the column, means for introducing a liquid in the column at its lower end, means for pulsing said liquid upwardly through the plates and the solids piled up thereon, and means for removing the liquid from the column at its upper end, the improvement comprising in combination with the storage leg, a pair of pressure taps connected to the storage leg at points vertically spaced from one another, a differential pressure cell connected to the taps, a valve connected to the lower end of the storage leg, a servo interconnecting the pressure cell and the valve for enabling the pressure cell to open the valve in response to a predetermined pressure difference in the pressure taps due to piling up of solids in the storage leg to a predetermined level, and means for fluidizing the solids in the storage leg to enable the pressure taps to sense the amount of solids in said storage leg.

2. The improvement specified in claim 1, the end of the lower pressure tap in the storage leg being directed downward so as to exert a negative feedback on the system.

3. The improvement specified in claim 1, the fluidizing means comprising a line introducing fluidizing liquid into the storage leg directly above the valve and serving also to prevent the valve from becoming clogged with solids and to compensate for the loss of liquid due to opening of the valve.

4. The improvement specified in claim 3, the end of the lower pressure tap in the storage leg being directed downward so as to exert a negative feedback on the system.

References Cited by the Examiner

UNITED STATES PATENTS

| | | | |
|---|---|---|---|
| 2,632,720 | 3/1953 | Perry | 210—268 X |
| 2,696,462 | 12/1954 | Bodkin | 210—268 X |
| 2,758,070 | 8/1956 | Yurko | 210—268 X |
| 2,771,407 | 11/1956 | Penick | 210—189 X |
| 2,771,408 | 11/1956 | Penick | 210—189 X |
| 2,773,012 | 12/1956 | Penick et al. | 210—268 X |
| 2,904,506 | 9/1959 | Penick | 210—189 X |

References Cited by the Applicant

UNITED STATES PATENTS

| | | |
|---|---|---|
| 1,135,119 | 4/1915 | Ledoux. |
| 1,880,206 | 10/1932 | Ledoux. |
| 2,295,485 | 9/1942 | Leone. |
| 2,692,164 | 10/1954 | Lockwood. |
| 2,709,843 | 6/1955 | Hartley. |
| 2,734,381 | 2/1956 | Jacobson. |
| 2,984,105 | 5/1961 | Nagel. |
| 3,069,849 | 12/1962 | Crim. |
| 3,080,876 | 3/1963 | Adamson. |

REUBEN FRIEDMAN, *Primary Examiner.*

D. M. RIESS, *Assistant Examiner.*